3,738,962
CYANURATES OF CYANATOPHENYL-TERMI-
NATED POLYARYLENE ETHERS
Basil L. Loudas, St. Paul, and Herward A. Vogel, Oakdale, Minn., assignors to Minnesota Mining & Manufacturing Company, St. Paul, Minn.
No Drawing. Original application July 1, 1968, Ser. No. 741,303. Divided and this application Mar. 8, 1971, Ser. No. 122,142
Int. Cl. C08g 23/00, 25/00
U.S. Cl. 260—47 R                                10 Claims

ABSTRACT OF THE DISCLOSURE

Cyanatophenyl-terminated polyarylene ethers are thermally polymerized to produce polyarylene ether cyanurates having outstanding strength, toughness, and flexibility and useful in adhesives, coatings, and binders.

RELATED APPLICATION

This is a divisional application of copending application Ser. No. 741,303, filed July 1, 1968, now U.S. Pat. 3,595,900.

FIELD OF THE INVENTION

This invention relates to polyarylene ether cyanurate polymers of said cyanato-terminated polyarylene ethers and to a method for the preparation of said polymers. In a further aspect it relates to shaped articles made from said cyanurate polymers.

PRIOR ART

Prior art disclosing cyanato-terminated polyarylene ethers and cyanurate polymers thereof is German Pats. 1,190,184 and 1,195,764. The cyanates disclosed there have only two phenylene nuclei linked by a single ethereal oxygen atom, and the resulting cyanurates thereof consist of a plurality of cyanurate rings linked by a diphenylene ether linkage. Though these cyanurate polymers have some desirable properties, their strength and toughness, as well as flexibility, are somewhat limited, thus restricting these polymers to applications where such properties are not required. Further, their thermal stability is not as high as desired. These prior art cyanates generally having relatively high volatility at cure temperatures (because of their relatively low molecular weight) and therefore are relatively toxic and inconvenient to handle. Also, they tend to exhibit runaway reaction during cure since the cyanate groups are present as a relatively large portion of the overall cyanate molecule.

BRIEF SUMMARY OF THE INVENTION

Briefly, in one aspect of this invention, cyanato-phenyl-terminated polyarylene ethers, the members of which have at least 3 aromatic nuclei (including those in the cyanatophenyl-terminal groups) linearly linked together by ethereal oxygen atoms, are thermally polymerized to form polyarylene ether cyanurate polymers. The cyanurate rings of said polymers are linked by at least 3 aromatic nuclei which in turn are linked by ethereal oxygen atoms. Said polymers are capable of being readily fabricated in the form of shaped articles having improved flexibility and outstanding strength and toughness.

DETAILED DESCRIPTION OF THE INVENTION

The cyanurate polymers of this invention are prepared by thermally polymerizing cyanatophenyl-terminated polyaryleneethers having the formula $$NCO—R—OCN \qquad (I)$$

where R is a divalent radical having at least 3, and as many as 15 or more, aromatic nuclei lineraly linked together with ethereal oxygen atoms, such as those nuclei selected from the group consisting of phenylene, diphenylene, and radicals of diphenyl ether, 2,2-diphenylpropane, benzophenone, and diphenylsulfone. These aromatic nuclei have structures shown as follows:

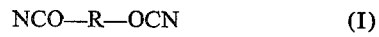

Representative cyanatophenyl-terminated polyarylene ethers coming within the scope of general Formula I, and preferred members of same, include those shown in Table II.

TABLE II

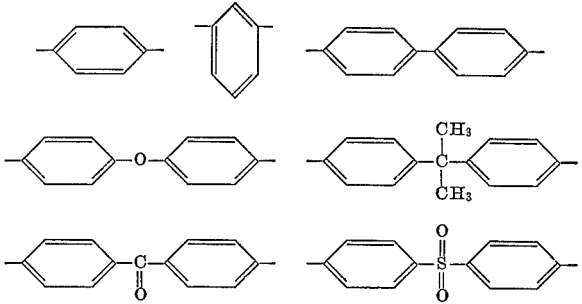

| Dicyanate | Melting point, °C. |
|---|---|
| (structure 1) | 133–135 |
| (structure 2) | 110–115 |
| (structure 3) | 98–100 |
| (structure 4) | 120 |

TABLE II—Continued

| Dicyanate | Melting point, °C. |
|---|---|
| NCO—⌬—O—(⌬—O—)ₙ~₁₀—⌬—OCN | 100 |
| NCO—⌬—C(CH₃)₂—⌬—O—(⌬—O—)ₙ~₁₀—⌬—OCN (where n is about 10) | 100 |
| NCO—⌬—O—⌬—C(=O)—⌬—O—⌬—OCN | 139–140 |
| NCO—⌬—O—⌬—S(=O)(=O)—⌬—O—⌬—OCN | ~70 |
| NCO—⌬—O—⌬—SO₂—⌬—O—⌬—SO₂—⌬—O—⌬—OCN | ~120 |

The dicyanates used in this invention can be prepared by reacting the dihydroxy polyarylene ether precursors with cyanogen halide in the presence of a base, such as triethylamine, as described in said copending application Ser. No. 741,303.

Polymerization of the cyanates is accomplished in accordance with this invention by heating the cyanates to effect their thermal polymerization. Homopolymers of the cyanates as well as copolymers of two or more of said cyanates can be prepared in this fashion.

The thermal polymerization of the cyanates, in accordance with this invention, involves trimerization of terminal cyanato groups to form a cyanurate that has a three-dimensional network structure with polyarylene ether linkages between cyanurate rings, the polymerization being illustrated as follows:

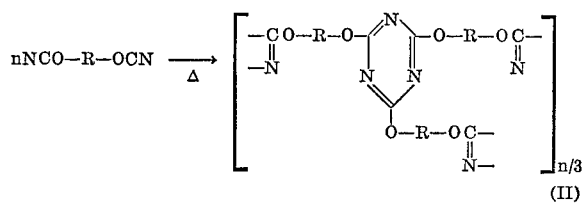

(II)

where $n$ is a multiple of 3 and can be as large as the number of molecules of dicyanate employed, and R is as defined in Formula I above.

Generally, the polymerization or curing of cyanates, in accordance with this invention, will be carried out by first melting the cyanate monomeric material to obtain a homogeneous melt and then raising the temperature in a range of 50 to 200° C., preferably 100 to 150° C. Alternatively, this polymerization can be carried out at lower temperatures, preferably 25 to 100° C., with the aid of activators, initiators or catalysts. These polymerization promoting agents representatively include Lewis acids, such as aluminum chloride, boron trifluoride, ferric chloride, titanium chloride, and zinc chloride; protonic acids, such as hydrochloric and other mineral acids; salts of weak acids, such as sodium acetate, sodium cyanide, sodium cyanate, potassium thiocyanate, sodium bicarbonate, sodium boronate, and phenylmercuric acetate; and bases, such as sodium methoxide, sodium hydroxide, pyridine, triethylamine, and the like. Preferred catalysts are non-ionic coordination compounds, such as cobalt, iron, zinc, and copper acetyl acetonates. The amount of catalyst used can vary, and generally will be 0.05 to 5 mole percent, preferably 0.05 to 0.5 mole percent.

The polymerization of the cyanates can also be carried out by polymerizing them in solution or in suspension, using as a solvent or suspension medium the common organic solvents such as hydrocarbons, ketones, halogenated hydrocarbons, nitrated hydrocarbons, dimethylsulfoxide, dimethylformamide or ether. The solvent can be removed by distillation or simple evaporation during the course of or at the end of the polymerization.

The cyanotophenyl-terminated polyarylene ethers are crystalline or amorphous solids which melt to flowable liquids at convenient working temperatures. They are soluble in a variety of organic solvents such as methylene chloride, chloroform, benzene, toluene, chlorobenzene, acetone, methyl ethyl ketone, ethylbenzoate, ethylcellulose, dimethylformamide, etc. They provide excellent bases for solvent-diluted coatings such as brush, spray, and dip coatings, particularly in the case of the higher molecular weight prepolymer type of dicyanates. The cyanatophenyl-terminated polyarylene ethers can be used as one-component cured-in-place resins which show good thermal stability along with resistance to solvents and corrosive chemicals such as dilute acids and basis. The fabrications of shaped articles from these cyanurate resins is greatly facilitated in that no volatile by-products are liberated during the curing process.

The cyanatophenyl-terminated ethers have relatively high molecular weight and consequently have low volatility and therefore less toxicity and can be conveniently handled at elevated temperatures. Also, reactions involving these cyanates can be controlled readily, in spite of exothermic heat generated, since the active cyanato groups constitute in part a small portion of the overall compound. The cyanurate polymers of this invention have improved strength, toughness, and impact resistance and can be used for adhesives, coatings and binders. The crosslinking density in the resin is relatively low because of the larger linear chain segments spaced between cyanurate rings. Resistance to thermal degradation caused by aging at high temperatures is also improved because of a reduced concentration of the relatively less stable cyanurate rings.

It is also within the scope of this invention to copolymerize one or more of said dicyanates with one or more mono or dicyanates of the prior art, such as the aromatic cyanates disclosed in German Pats. 1,190,184 and 1,195,764, Angew Chemie 76, 303 (1964) and Acta Chem. Scand. 18 826 (1964). Preferred aromatic cyanates useful in this invention for this purpose are those of the general formula:

 (III)

where $R_a$ is hydrogen, cyanato, or an aromatic nuclei such as that derived from benzene, naphthalene, or biphenyl, which nuclei can have a cyanato group as a ring substituent. The amount of such aromatic cyanate which can be copolymerized with the polyarylene ether cyanates can vary and generally will be dictated by the particular properties desired to be imparted by them to the cyanurate polymers. For example, the degree of crosslinking of the polymer can be increased in some instances by incorporating such aromatic short chain dicyanates. The heat distortion temperature of the polymer can thereby be increased.

Other cyanates which can be copolymerized with those of this invention are the cyanatomethyl-terminated fluoroocarbons disclosed in copending application Ser. No. 741,308, filed July 1, 1968, now abandoned, and incorporated herein by reference. These cyanates can be represented by the general formulas:

$$F_3C(CFX)_aA(CFX)_bCH_2OCN \quad (IV)$$

where A is a carbon-to-carbon bond (in which case subscript $a$ is 1 to 30 and subscript $b$ is zero) or —O(CFX—CF$_2$—O)$_c$ (in which case case subscript $a$ is 1 to 10, subscript $b$ is 1 and subscript $c$ is 1 to 100), and dicyanates of the general formula:

$$NCOCH_2(CFX)_aB(CFX)_bCH_2OCN \quad (V)$$

where B is (1) a carbon-to-carbon bond, in which case $a$ is an integer of 1 to 30 and $b$ is zero, or (2) B is [(CFX)$_d$O(CFX)$_e$]$_f$, in which case $a$ and $b$ are zero, $d$ and $e$ are integers of 1 to 30, and $f$ is an integer of 1 to 20, or (3) B is $$(OCF_2—CFX)_gO(CFX)_dO(CFX)_hO(CFX—CF_2O)_i,$$

in which case $a$ and $b$ are 1, $h$ is an integer of 1 to 10, and $g$ and $i$ are integers of 1 to 100, or (4) B is [(CF$_2$CH$_2$)$_j$(CF$_2$—CFX)$_k$]$_m$, in which case $a$ and $b$ are integers of 1 to 10, $j$ and $k$ are integers whose ratio $j/k$ is 1/1 to 10/1, $m$ is an integer of 1 to 100, and (CF$_2$CH$_2$) and (CF$_2$—CFX) are randomly distributed units;

and where X in all instances where it appears in Formulas IV and V is fluorine or perfluoroalkyl.

When the cyanates of general Formulas IV and V are copolymerized with the cyanato-terminated polyarylene ethers, the resultant copolymers will have improved chemical resistance and thermal stability, such properties being imparted by the fluorocarbon monomeric units incorporated into the polymers.

Cyanurate polymers of this invention can broadly be illustrated by the generic formula:

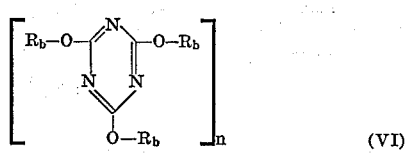 (VI)

where at least one of said $R_b$ groups is —R—OC=N— (where R is as defined in Formula I) and the other $R_b$ groups can be cyanato-free residues of chain-terminating monocyanates or chain-extending linkages of dicyanates of the prior art. For example, said other $R_b$ groups can be selected from the group

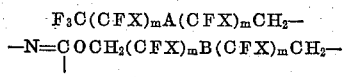

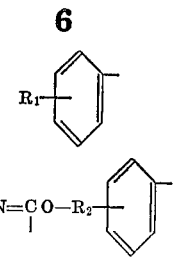

where $R_1$ is hydrogen or an aromatic nucleus (see Formula III), $R_2$ is an oxygen-to-carbon bond or an aromatic nucleus (see Formula III), and where Formula VI, $n$ is an integer dependent on the functionality of the monomers where a dicyanate is included.

Where a monocyanate is copolymerized with a dicyanate, copolymeric cyanurates are formed in which the network growth and crosslinking density are reduced by the chain-terminating monocyanate monomer, whether the latter is a fluorocarbon monocyanate or an aromatic monocyanate. Generally, where used, the prior art cyanates will amount to 5 to 95 wt. percent, preferably 5 to 50 wt. percent, of the cyanurate polymer.

The objects and advantages of this invention are further illustrated by the following examples, but the particular materials and amounts thereof recited in these examples as well as other conditions and details should not be construed to unduly limit this invention.

EXAMPLE 1

In a 3-neck, 1000 ml. round bottom flask, a mixture of 56 g. of cyanogen bromide (0.53 mole) and 73.5 g. (0.25 mole) of 1,4-bis(p-hydroxyphenoxy)benzene (prepared as described in U.S. Patent 3,219,670) is dissolved in 300 ml. of cold acetone. The stirred solution is cooled by means of ice water bath and 50.0 g. (0.50 mole) of triethylamine is added at a slow enough rate to maintain the temperature at about 5° to 10° C. After completion of the reaction, the slurry is poured into 2 liters of ice water. The precipitate, 1,4-bis(p-cyanatophenoxy)benzene, is recovered by suction filtration, washed with cold methanol and dried at room temperature in a rotary vacuum drier. Yield: 48 g., M.P. 135° C. The dicyanate (designated as composition A) can be cured at 150° C. to form a cyanurate which is a strong tough plastic. The glass transition temperature, Tg, as measured by differential thermal analysis, is 190 to 207° C. Other physical properties are shown in Tables III and IV.

EXAMPLE 2

4,4'-bis(p - cyanatophenoxy)diphenyl ether is prepared from 1,4-bis(p-hydroxyphenoxy)phenol ether (described in U.S. Patent 3,219,670) by reaction with 2 moles of cyanogen bromide and triethylamine following a similar procedure as outlined in Example 1. The cyanate product (designated as composition B) is obtained as an amorphous powder showing a melting point at about 100° C. The cured cyanurate resin obtained upon heating at 150 to 200° C. for ½ to 1 hr. has a Tg of 160 to 175° C. Other properties are shown in Tables III and IV.

EXAMPLE 3

4,4-bis(m-cyanatophenoxy)diphenyl ether is prepared from the corresponding diol (described in U.S. Patent 3,219,670) by reaction with 2 moles of cyanogen chloride and triethylamine in acetone solution at —20 to —10° C. following a similar procedure as described in Example 1. The wet precipitate is dissolved in methylene chloride and after drying of the methylene chloride solution with anhydrous magnesium sulfate the product is recovered by evaporation of the solvent. The crystalline cyanate compound (designated as composition C) melts at 98–100° C. Properties of the cured cyanurate resin obtained upon heating at 150 to 200° C. for ½ to 1 hr. are shown in Tables III and IV.

EXAMPLE 4

4,4-bis(cyanatophenoxy)diphenyl sulfone is prepared by starting with the Ullmann condensation of dichlorodiphenyl sulfone and p-methoxyphenol. In a one-liter flask heated in an oil bath and provided with mechanical stirrer, nitrogen inlet and outlet, and adapter for downward distillation, are placed 150 g. (1.2 mole) of p-methoxyphenol and 66 g. of 85% pulverized potassium hydroxide. The mixture is heated under a slow stream of nitrogen for about 15 minutes at a temperature of 180° C. to drive off most of the liberated water. Then, 1 g. of cupric oxide catalyst and 144 g. (0.5 mole) of p-dichlorodiphenyl sulfone is added. The temperature is slowly increased to 200° C. and maintained for about one hour. The thick reaction mixture is then diluted with 100 ml. of dimethylformamide and poured into 2 liters of hot water. The 4,4'-bis(p-methoxyphenoxy)diphenyl sulfone is recrystallized from DMF/methanol. Yield 154 g., M.P. 114–116° C.

In a 600-ml. beaker are placed 50 g. of the above methoxyphenoxy compound and 100 g. of pyridine hydrochloride. The mixture is heated on an electrical hot plate to an internal temperature of 210–220° C. while stirring. The mixture is maintained at slight boiling for about 15 min. until a clear solution is obtained and then poured into 2 liters of water. The separated 4,4'-bis(p-hydroxyphenoxy) diphenyl sulfone is recrystallized from methanol/water. Yield: 42 g., M.P. 188–189° C.

The diol is converted to the dicyanate by reaction with 2 mole of cyanogen bromide and triethylamine following essentially the procedure described in Example 1. The 4,4'-bis(p-cyanatophenoxy)diphenyl sulfone (designated as composition D) is obtained as an amorphous powder melting at about 70° C. The cured cyanurate resin obtained upon heating at 150 to 200° C. for 1 hr. shows a Tg at 160–173° C.

4,4' - disulfonyl(p - cyanatophenoxyphenyl)diphenyl ether, a higher molecular weight arylenesulfone ether cyanate, is obtained similarly from 4,4'-disulfonyl(p-hydroxyphenoxyphenyl)diphenyl ether. The diol is prepared from 4,4'-diphenyl ether disulfonyl chloride and p-methoxydiphenyl ether by Friedel-Crafts condensation and cleavage of the methoxy groups with pyridine hydrochloride.

EXAMPLE 5

4,4'-bis(p-cyanatophenoxy)dibenzophenone in a suitable vessel 200 g. of p,p'-dichlorodiphenyl-2,2,2-trichloroethane (DDT) and 0.5 g. of ferric chloride are heated at about 120–140° C. until evolution of hydrogen chloride ceases. The product is then recrystallized from ethanol to give a nearly quantitative yield of p,p'-dichlorodiphenyl 2,2-dichloroethylene, M.P. 88–89° C. The latter compound (130 g.) is oxidized in glacial acetic acid (750 ml.) with chromium trioxide (80 g.) at 80–100° C. The $CrO_3$ is added carefully in portions to avoid excessive foaming. The p,p'-dichlorobenzopheone is isolated by pouring of the reaction mixture in water and trituration of the precipitated product with methanol. Yield: 85 g., M.P. 144° C.

The p,p'-dichlorobenzophenone is reacted with potassium p-methoxy-phenolate at 230° C. following the procedure as described for a similar Ullmann reaction in Example 4. The resulting 4,4'-bis(p-methoxyphenoxy) benzophenone (M.P. 198–200° C.) is hydrolyzed to the diol by fusion with pyridine hydrochloride for one hour at about 220° C. The 4,4'-bis(p-hydroxyphenoxy)benzophenone after recrystallization from glacial acetic acid melts at 217–219° C.

The diol is converted to the dicyanate by reaction with 2 moles of cyanogen bromide and triethylamine following essentially the procedure described in Example 1. The 4,4'-bis(p-cyanatophenoxy)benzophenone (designated as composition E) melts at 138–140° C. The cured cyanurate resin obtained after heating at 150–200° C. has a Tg at 175–190° C.

EXAMPLE 6

A hydroxy-terminated copoly(p,o-phenylene oxide) of about 900 molecular weight is prepared from p-chlorophenol, o-chlorophenol and 4,4'-isopropylidenediphenol as follows.

A one-liter, three-neck flask is equipped with a packed column topped by a Dean-Stark azeotrope separator and reflux condenser on the center neck, a nitrogen inlet and thermometer on one side and a dropping funnel with pressure equalizing arm on the other side. A coated magnet (coated with Teflon polytetrafluoroethylene) is placed in the flask, and a magnetic stirrer is placed beneath the heating mantle supporting the flask.

Pyridine (450 ml.), benzene (150 ml.), p-chlorophenol (167.1 g., 1.30 mole), o-chlorophenol (90.0 g., 0.70 mole) and Bisphenol-A (45.6 g., 0.20 mole) are weighed into the flask through one of the side necks, and 45% aqueous potassium hydroxide (267.8 g., 2.16 mole) is added to the dropping funnel.

The top of the reflux condenser is attached to a vacuum pump or water aspirator, and the system is flushed several times with nitrogen while the base is allowed to flow into the solution during 5–10 minutes. The system is finally restored to atmospheric pressure with nitrogen, and heat is applied while a slight positive pressure of nitrogen is maintained.

Water is removed by azeotropic distillation via the Dean-Stark trap until no further water separates from the benzene distillate. A heavy slurry of precipitated phenolates is obtained.

The magnetic stirrer and packed column are then removed, a mechanical stirrer is placed in the center neck, and the Dean-Stark trap and reflux condenser are put in the side neck in place of the dropping funnel. Solvent is removed through the Dean-Stark trap until the solution temperature reaches 160° C. A solution of cuprous chloride (.425 g., .004 mole) in pyridine (60 ml.) is added by injection through the rubber tubing of the nitrogen inlet with a hypodermic syringe and the temperature is maintained at 160–170° C. for 3.0 hrs. Finally, the temperature is raised to 250° for 2 hrs. and the reaction is stopped by dilution with 200 ml. of pyridine. After cooling, the mixture is precipitated in water using a blender to disperse the solid polymer.

The slurry is filtered and the solid is washed successively with water, methanol, dilute hydrochloric acid, water and finally methanol before being dried in a vacuum oven at 40° C. The yield is 215 g. The inherent viscosity in 1% chloroform solution is .07. The prepolymer softens at about 80° C. The number average molecular weight by vapor pressure osmometry (VPO) is 900 and the hydroxyl equivalent weight is 536 when determined by the method of Ogg, Porter and Willits, Ind. Eng. Chem., Anal. Ed., 394, June, 1945. The hydroxy-terminated prepolymer has the following structure:

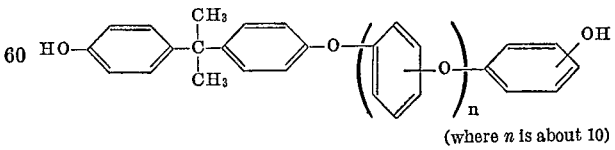

(where $n$ is about 10)

To a solution of 53.5 g. (0.1 mole equivalent) of the dihydroxy prepolymer and 11.5 g. (0.11 mole) of cyanogen bromide in 250 ml. of acetone, is added with stirring 10.1 g. (0.10 mole) of tirethylamine. The temperature of the reaction mixture is maintained at about 5° C. by means of an external cooling bath. After completion of the amine addition, the mixture is poured into water. The precipitated sticky product is separated and digested with cold methanol. After filtration, the cyanatophenyl-terminated copoly(p,o-phenylene oxide) (designated as composition F) is obtained as a tan, amorphous powder which softens at about 80° C. The cyanophenyl-terminated prepolymer cures at 150° C. to a tough cyanurate plastic which has a Tg of 104–115° C.

EXAMPLE 7

The dicyanate compounds made as described in Examples 1 to 6 (designated as compositions A through F) are used to adhesively bond one inch wide by 0.063 inch thick aluminum strips for ½ inch overlap by curing at 350° F. for one hour at 25 p.s.i. bond pressure. Shear tests are performed on an Instron test machine according to test method ASTM D–1002. The overlap shear tensile strength in lbs./sq. in. at various temperatures are shown in Table III.

Table IV lists test data on Izod impact strength (ASTM D–256–56A) of the cured compositions A, B, C, and E. The samples are prepared by curing 25 g. of the dicyanate compound in a leveled one inch wide by eight inch long cavity mold at 300° F. for about 5 hrs. and at 500° F. for ½ hr. Each of the approximately ⅛ inch thick bars is cut with a band saw into four ½-by-4-inch test specimens.

TABLE III

| Composition | Overlap shear tensile strengths (p.s.i.) at— | | | | | |
|---|---|---|---|---|---|---|
| | −67° F. | 75° F. | 180° F. | 250° F. | 300° F. | 350° F. |
| A | 4,400 | 4,400 | 3,900 | 3,000 | | 1,350 |
| B | 4,000 | 4,000 | 3,500 | 3,500 | 2,000 | 1,000 |
| C | 5,500 | 3,800 | 3,500 | 2,900 | 2,000 | 1,200 |
| D | 1,600 | 1,800 | 1,400 | 1,800 | | 1,300 |
| E | 2,200 | 2,100 | 3,400 | 1,500 | | 400 |
| F | 3,800 | 4,200 | 4,000 | 2,000 | | |

TABLE IV

| Composition: | Impact strengths, ft. lbs. |
|---|---|
| A | 1.6 |
| B | 2.0 |
| C | 2.9 |
| E | 3.2 |

The data of Table III show the desirably high tensile strengths, particularly those at room temperature and low temperature when compared with prior art cyanurate polymers, exhibited by the cyanurate polymers of this invention. The data of Table IV show the desirably high impact values exhibited by these polymers, which are considerably better than that for prior art cyanurate polymers, indicating better toughness and flexibility.

Various modifications and alterations of this invention will become apparent to those skilled in the art without departing from the scope and spirit of this invention, and and it should be understood that this invention is not to be unduly limited to the illustrative embodiment set forth herein.

We claim:

1. Cyanurate polymers consisting essentially of units of the formula

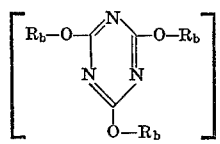

where at least one of said $R_b$ groups is $-R-OC=N-$, where R is a divalent radical having at least 3 aromatic nuclei linearly linked together with ethereal oxygen atoms, said nuclei being selected from the group consisting of phenylene, diphenylene, and radicals of diphenyl ether, 2,2-diphenylpropane, benzophenone, and diphenylsulfone, and the other $R_b$ groups can be cyanato-free residues of chain terminating monocyanates or chain-extending dicyanates.

2. Cyanurate polymers according to claim 1, where said other $R_b$ groups are selected from the group $$F_3C(CFX)_aA(CFX)_bCH_2- \qquad (I)$$

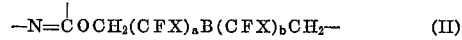

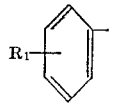

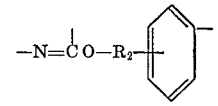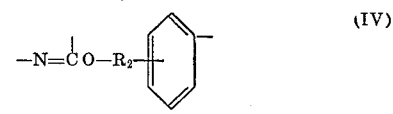

where
A is a carbon-to-carbon bond (in which case subscript $a$ is 1 to 30 and subscript $b$ is zero) or $-O(CFX-CF_2-O)_c$ (in which case subscript $a$ is 1 to 10, subscript $b$ is 1 and subscript $c$ is 1 to 100);
B is (1) a carbon-to-carbon bond, in which case $a$ is an integer of 1 to 30 and $b$ is zero, or (2) B is $[(CFX)_dO(CFX)_e]_f$, in which case $a$ and $b$ are zero, $d$ and $e$ are integers of 1 to 30, and $f$ is an integer of 1 to 20, or (3) B is $(OCF_2-CFX)_gO-(CFX)_hO(CFX-CF_2O)_i$, in which case $a$ and $b$ are 1, $h$ is an integer of 1 to 10, and $g$ and $i$ are integers of 1 to 100, or (4) B is $[(CF_2CH_2)_j(CF_2-CFX)_k]_m$, in which case $a$ and $b$ are integers of 1 to 10fi $j$ and $k$ are integers whose ratio $j/k$ is 1/1 to 10/1, $m$ is an integer of 1 to 100, and $(CF_2CH_2)$ and $(CF_2-CFX)$ are randomly distributed units;
X in all instances where it appears in this claim is fluorine of perfluoroalkyl; $R_1$ is hydrogen or an aromatic nucleus; and $R_2$ is an oxygen-to-carbon bond or an aromatic nucleus.

3. Cyanurate polymers consisting essentially of units of the formula

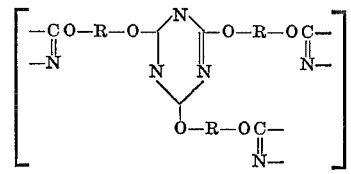

where R is a divalent radical having at least 3 aromatic nuclei linearly linked together with ethereal oxygen atoms, said nuclei being selected from the group consisting of phenylene, diphenylene, and radicals of diphenyl ether, 2,2-diphenylpropane, benzophenone, and diphenylsulfone.

4. Cyanurate polymers according to claim 3, where R is

5. Cyanurate polymers according to claim 3, where R is

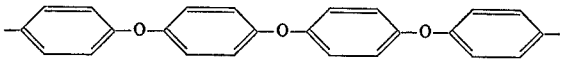

6. Cyanurate polymers according to claim 3, where R is

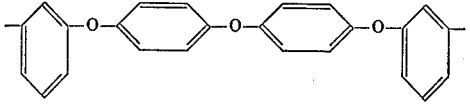

7. Cyanurate polymers according to claim 3, where R is

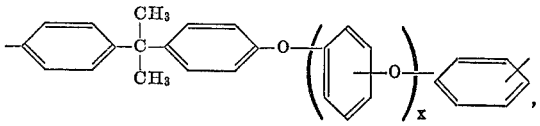

where $x$ is about 10.

8. Cyanurate polymers according to claim 3, where R is
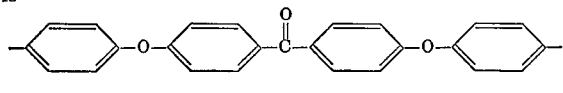
9. Cyanurate polymers according to claim 3, where R is
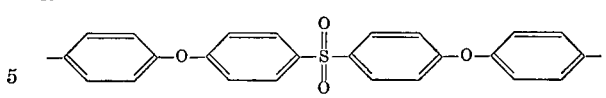
10. Cyanurate polymers according to claim 3, where R is
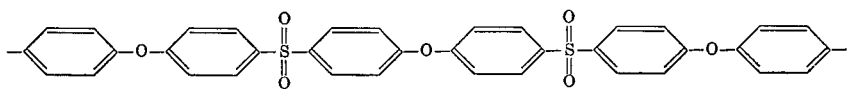
References Cited
FOREIGN PATENTS
1,016,245 1/1966 Great Britain.
1,523,551 3/1968 France.
1,190,184 12/1965 Germany.
MELVIN GOLDSTEIN, Primary Examiner
U.S. Cl. X.R.
161—213; 260—31.2 T, 31.2 N, 32.6 R, 32.6 N, 32.8 R, 32.8 N, 33.6 R, 33.8 R, 49

UNITED STATES PATENT OFFICE
CERTIFICATE OF CORRECTION

Patent No. 3,738,962        Dated June 12, 1973

Inventor(s) Basil L. Loudas and Herward A. Vogel

It is certified that error appears in the above-identified patent and that said Letters Patent are hereby corrected as shown below:

Column 2, line 21, "polyaryleneethers" should read
-- polyarylene ethers --.

The heading -- TABLE I -- should appear above the structures at Column 2, lines 33-45.

Column 4, line 37, "cyanotophenyl-" should read
-- cyanatophenyl- --.

Column 5, line 21, "roocarbons" should read -- rocarbons --.

Column 5, line 67, "-R-OC=N-" should read -- -R-OC=N- --.

Column 8, line 68, "tirethylamine" should read
-- triethylamine --.

Column 9, line 66, "-R-OC=N-" should read -- -R-OC=N- --.

Column 10, line 29, "10fi" should read -- 10, --.

Column 10, lines 40-45, the formula should read

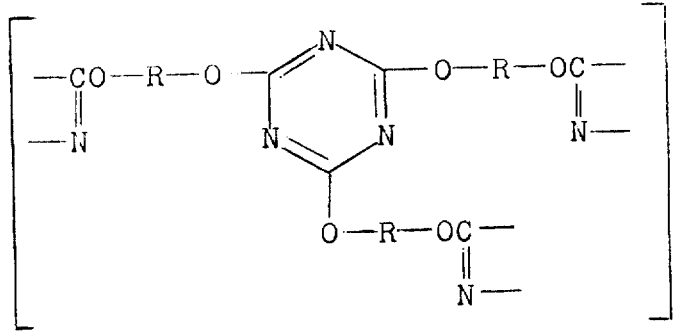

Signed and sealed this 18th day of December 1973.

(SEAL)
Attest:

EDWARD M. FLETCHER, JR.
Attesting Officer

RENE D. TEGTMEYER
Acting Commissioner of Patents